C. DAVIS.
APPARATUS FOR DETERMINING RANGES.
APPLICATION FILED MAR. 22, 1911.
1,063,862.
Patented June 3, 1913.
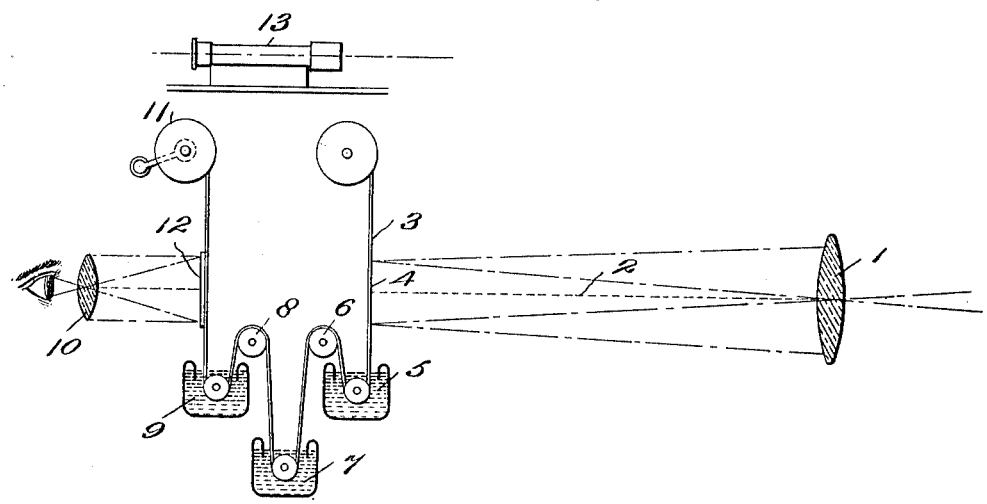
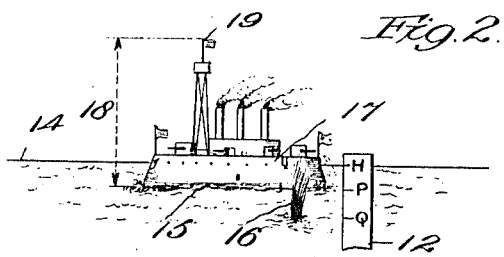
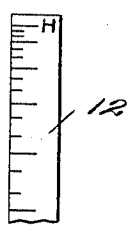
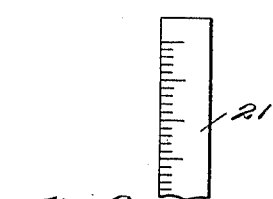
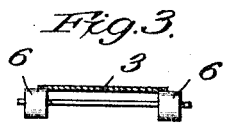
Witnesses
Geo. H. Byrne
Byron B. Collings
Inventor
Cleland Davis
by Wilkinson
Fisher & Witherspoon
Attorneys

UNITED STATES PATENT OFFICE.

CLELAND DAVIS, OF THE UNITED STATES NAVY.

APPARATUS FOR DETERMINING RANGES.

1,063,862. Specification of Letters Patent. Patented June 3, 1913.

Application filed March 22, 1911. Serial No. 616,271.

*To all whom it may concern:*

Be it known that I, CLELAND DAVIS, a citizen of the United States, lieutenant commander in the United States Navy and serving on board the U. S. S. *Mississippi*, have invented certain new and useful Improvements in Apparatus for Determining Ranges; and I do hereby declare the following to be a full, clear, and exact description of the invention, such as will enable others skilled in the art to which it appertains to make and use the same.

The present invention relates to a method of and an apparatus for determining ranges and spotting the points of impact of projectiles and has for its object to provide a means that will furnish an accurate picture to scale of the region surrounding the point at which a projectile strikes during gun fire, and which will also enable the operator to determine with accuracy from this picture the distance between the target and the point of striking of a projectile, the height of the object fired at, as well as other data which will appear hereinafter.

To these ends the invention consists in the steps constituting my process, and the novel arrangement of parts more fully hereinafter disclosed and particularly pointed out in the claims.

Referring to the accompanying drawings forming a part of this specification in which like numerals designate like parts in all the views:—Figure 1 is a diagrammatic sectional view of an instrument comprising a camera built in accordance with my invention; Fig. 2 is a diagrammatic view of the picture taken by the camera and from which the various computations may be made; Fig. 3 is a detail view showing a pair of the film guiding rollers; Fig. 4 illustrates a graduated range finder scale; Fig. 5 illustrates a scale employed in ascertaining the height of the object fired at; and Fig. 6 illustrates a scale employed for determining the distance of the object when the height has been measured on the picture by the scale shown in Fig. 5.

In the present state of the art of naval gunnery the main difficulty experienced by gunnery officers is due to the lack of means for determining the range of the target with sufficient accuracy to obtain a correct elevation of the sight bar on the gun being fired. According to present methods, the range of the target is found from range finders having a limited base and the inaccuracies of these instruments are well known. Gunnery officers, therefore, do not wholly rely upon them as a means of obtaining an accurate sight bar range in elevating the guns, but instead they consider the distances so obtained as merely approximations that give a basis, so to speak, from which, by observing the splash and estimating its distance from the target, the necessary correction can be applied to the sight bar height to bring the next projectile to the target.

As is well known, it is the duty of the spotter to estimate this correction. He is stationed aloft and by the aid of glasses estimates with his eye the distance the projectile strikes over or short of the target and then communicates the corresponding sight bar correction to the sight setters at the guns. But it is recognized that these methods are unproductive of results commensurate with the accuracy of the guns, not only for want of accurate and reliable range finders, but also because personal errors are involved, and further, the human eye is not adapted to the measurement of distances, so that the spotter's corrections are, in fact, hardly more than good guesses.

My invention obviates the above objections by making use of a camera having an objective of a known focal length, which therefore produces a permanent picture to scale of the relative positions of the horizon, the target, and the splash, and from which all the necessary data required by the gunner may be accurately determined, as will now appear.

1 indicates the object glass of any suitable camera having a known focal length 2, and provided with a sensitive surface 3 on which is produced an image 4 of a size proportional to the object photographed, and this surface or film is passed through a developing fluid 5 over a pair of rollers 6, through a washing fluid 7, over a pair of rollers 8, through a fixing solution 9 and past the magnifying lenses 10 carried by the camera on to the winding reel 11, as shown. Of course, any other suitable arrangement of the sensitized surface may be employed if desired.

A scale 12 is mounted within the focus of the lens 10 and is graduated in accordance with the angles subtended between the object fired at and the horizon for a given height above the water line, and for the fixed focal distance 2 of the lens 1. In other words, since the points of graduation of the scale 12 correspond to the angles subtended by the horizon and water line of the vessel being fired at, they may, therefore, be made to correspond to the distances between said water line and the observer, as will be clear to those familiar with Buckner's method of determining distances at sea.

The camera being located for example, in the top of a vessel and at the distance above the water line corresponding to that for which the scale 12 is graduated, is then sighted upon the object by the aid of the finder telescope 13. The target being brought into the field of the camera, the picture is then taken in the usual way, is developed, fixed and then brought into the focus of the magnifying or observing glass 10, as will be readily understood. Now, since the scale 12 is graduated for distances corresponding to the angle subtended by the object and horizon, as above stated, if the horizon line H of the said scale is made by means of a micrometer screw, not illustrated, to coincide with the horizon line 14 on the picture, the distance H P on the scale 12 between the said horizon line 14 and the water line 15 of the ship being fired at will give the distance of the said ship from the point of observation. The distance of the ship being fired at having been obtained, in the manner described, it is used as a sight bar range for the guns. Upon firing, however, the splash 16 of the projectile will be plainly visible in the vicinity of the target and another picture is taken which will include as before the horizon line 14, the water line 15, and in addition, the splash 16. Proceeding as before, this picture is now brought into focus of the magnifying glass 10, the scale 12 is applied and the distance P Q on said scale corresponding to the amount the shot falls short of or falls beyond the target is noted. In other words, the second picture upon a comparison of the range given by the sight bar with the real range as given by the scale 12, gives at once the ballistic error of the gun. It follows that for the next shot the necessary correction may then be applied to the sight bar range which will immediately bring the gun on the target. When the distance of the target is known, the point of impact of a projectile may be determined by placing the graduation corresponding to that distance on the water line of the target, then the mark on the scale which coincides with the splash will give the distance of the point of fall.

It sometimes may happen that the horizon 14 of the sea is invisible, while the water line 15 of the ship 17 is visible. In such case, the distance of the target or ship may be estimated by any of the well known means now in use aboard ship, and the splash noted as before. Then upon observing the distance P Q between the splash and the ship fired at, the sight bar reading is corrected for such distance, whereupon if the target is not struck, the operation is repeated until the distance between the splash and the target is eliminated and a shot is observed to reach the target. Or, the range corresponding to the sight bar height may be used as a point of reference, the mark on the scale corresponding to this height being made coincident with the splash, when the graduation coincident with the water line of the target will give the approximate distance of the target. It will thus be seen by the simple expedient of producing a picture to scale showing the relative positions of the horizon, the water line of the target and the splash of the projectile, and by taking measurements from this picture, I am enabled to accurately determine all the necessary data for accurate firing.

As above stated, however, not only does the distance of the horizon bear a fixed relation to the height of the image with a given focal length of lens, but when the distance of the target, the height of the image and the focal distance of the lens are all known, the height of the target may be obtained. That is to say, to determine the height 18 of the point 19 from the water line 15, the distance of said water line from the point of observation having been found as above described, the scale 12 is withdrawn from the focus of the lens 10, and the scale 21 is substituted therefor. This latter scale is graduated in suitable units, and the height is obtained from the formula $$\frac{\text{Height of object}}{\text{Height of image}} = \frac{\text{Distance of object}}{\text{Focal length of lens}}$$

From the height thus obtained, by the aid of the scale 22, the distance of the object may be readily determined, when the horizon is not visible.

The scale 22 is graduated as follows:— Starting at any distance from the point of observation say 2000 yards, the line 23 of the scale 22 is drawn of that length which the known height of a target would occupy in the picture on the film 3. Then the next division 24 of the scale 22 would be drawn of a length to represent the same height of the target at a range of say 2500 yards, and the next line 25 to represent the same height of target at a distance of say 3000 yards, and so on until the line 26 might represent the height of the same target at a distance of 8000 yards. The object in obtaining the height 18 is to enable the range to be obtained by subsequent observations when the horizon is invisible or not clearly defined. It will also enable the range to be closely determined by observing with similar instruments located closer to the water line where it is not practicable to measure the angle subtended between the horizon and the water line. The scale 22 corresponding to this height is inserted in the focus of the eyepiece 10, in place of the scale 12, the picture taken and the scale moved laterally until the height 18 is just included between the slant line and the base line. The graduation on the base line at the bottom of the ordinate will thus indicate the range.

It will be noted that when the height method of determining the range is used, the instrument need not be mounted at a fixed height above the horizon. It is only necessary that the known height of the target be included in the picture, for as the object approaches or recedes the height of the image increases or decreases proportionately, and the range is really determined by a similarity of triangle.

Other valuable uses of the instrument suggest themselves. For example, by taking a series of observations at regular intervals the course and speed of moving vessels may be readily determined. Also since the instrument provides a picture to scale of distant objects, light houses and other known objects on shore may be photographed and used as a basis for obtaining useful data. The scales are made removable so that the instrument may be used either as a spotting instrument or to determine the distance of an object at sea when the height is known. Thus the distance of an object may be determined by means of the Buckner scale or the actual height of the object being known it can be used as a basis to determine its distance. A number of scales graduated for different heights are provided.

It is obvious that those skilled in the art may vary the details of construction and the arrangement of parts as well as the steps of the method disclosed without departing from the spirit of my invention, and therefore I do not wish to be limited to the disclosure above, except as may be required by the claims.

What I claim is:—

1. In a distance instrument, the combination of a camera adapted when located at a known distance above the plane of the horizon to make a picture of said horizon and an object having an unknown height; and a plurality of scales graduated in accordance with said distance and height adapted to determine by the aid of said picture the real distance and height of said object, substantially as described.

2. In a distance instrument, the combination of a camera adapted to make a photograph of an object and the horizon from a position at a known distance above the horizon; a scale graduated to said distance adapted to measure in terms of the real range the distance between said object and horizon on said picture; and means for magnifying said scale and picture, substantially as described.

3. In a distance instrument, the combination of a camera adapted when located at a known distance above the plane of the horizon to make a picture of said horizon and an object having an unknown height; a plurality of scales graduated in accordance with said distance and height adapted to determine by the aid of said picture the real distance and height of said object; and means for magnifying said scales and picture, substantially as described.

4. In a distance instrument, the combination of a camera adapted when located at a known distance above the plane of the horizon to make a picture of said horizon and an object having an unknown height; means for immediately developing and fixing said picture associated with said camera; and a plurality of scales graduated in accordance with said distance and height adapted to determine by the aid of said picture the real distance and height of said object, substantially as described.

In testimony whereof, I affix my signature, in presence of two witnesses.

CLELAND DAVIS

Witnesses:
R. M. PARKER,
ERNEST WILKINSON.

---

Copies of this patent may be obtained for five cents each, by addressing the "Commissioner of Patents, Washington, D. C."